(No Model.) 4 Sheets—Sheet 1.

S. OLSON.
COMBINED HAY RAKE AND COCKER.

No. 335,834. Patented Feb. 9, 1886.

WITNESSES:
INVENTOR:
S. Olson
BY Munn & Co
ATTORNEYS.

(No Model.) 4 Sheets—Sheet 2.

S. OLSON.
COMBINED HAY RAKE AND COCKER.

No. 335,834. Patented Feb. 9, 1886.

WITNESSES:
Chas. Nida.
C. Sedgwick

INVENTOR:
S. Olson
BY Munn & Co
ATTORNEYS.

(No Model.)　　　　　　　　　　　　　　　　　　　4 Sheets—Sheet 3.
S. OLSON.
COMBINED HAY RAKE AND COCKER.
No. 335,834.　　　　　　　　　Patented Feb. 9, 1886.
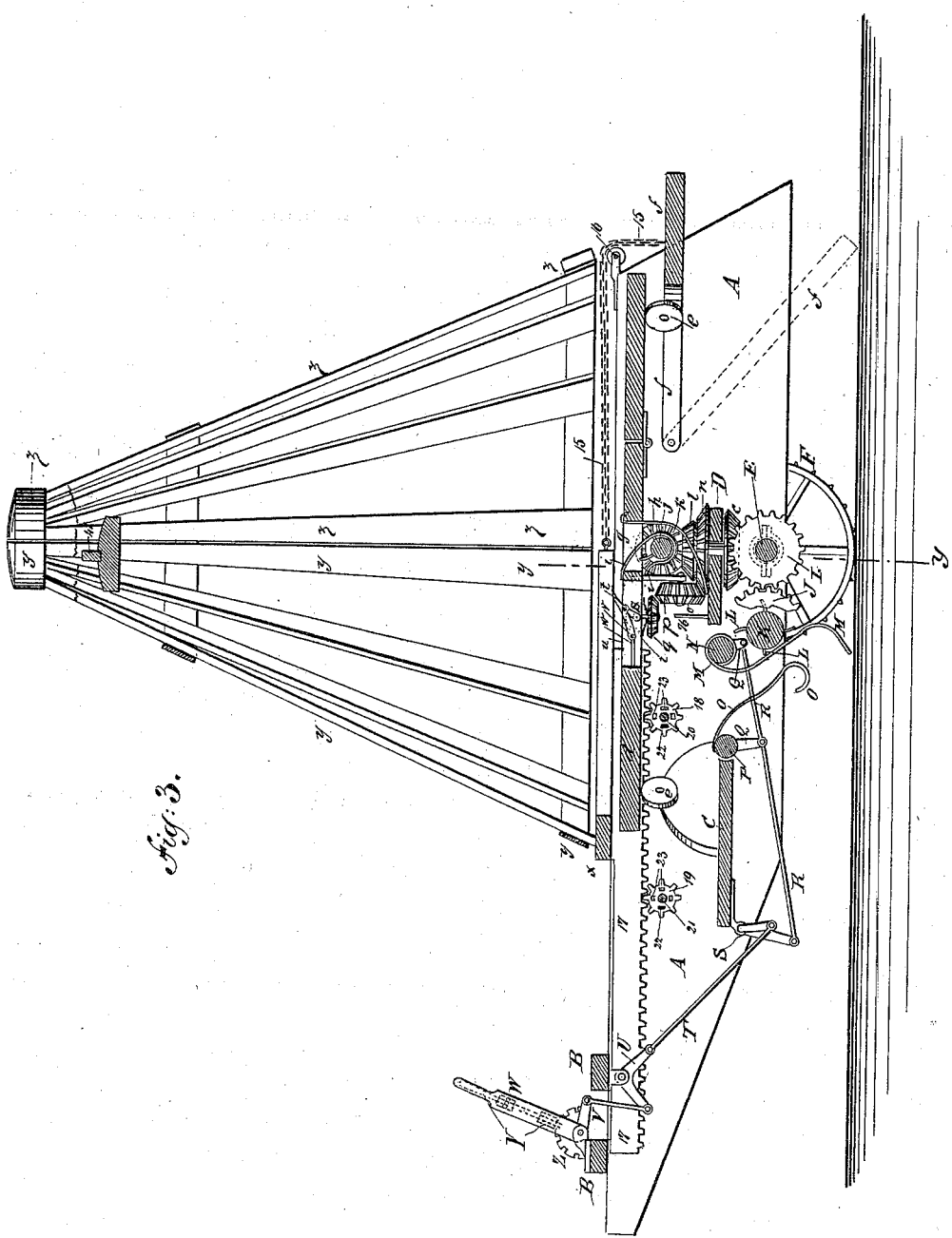
WITNESSES:
INVENTOR:
S. Olson
BY Munn & Co.
ATTORNEYS.

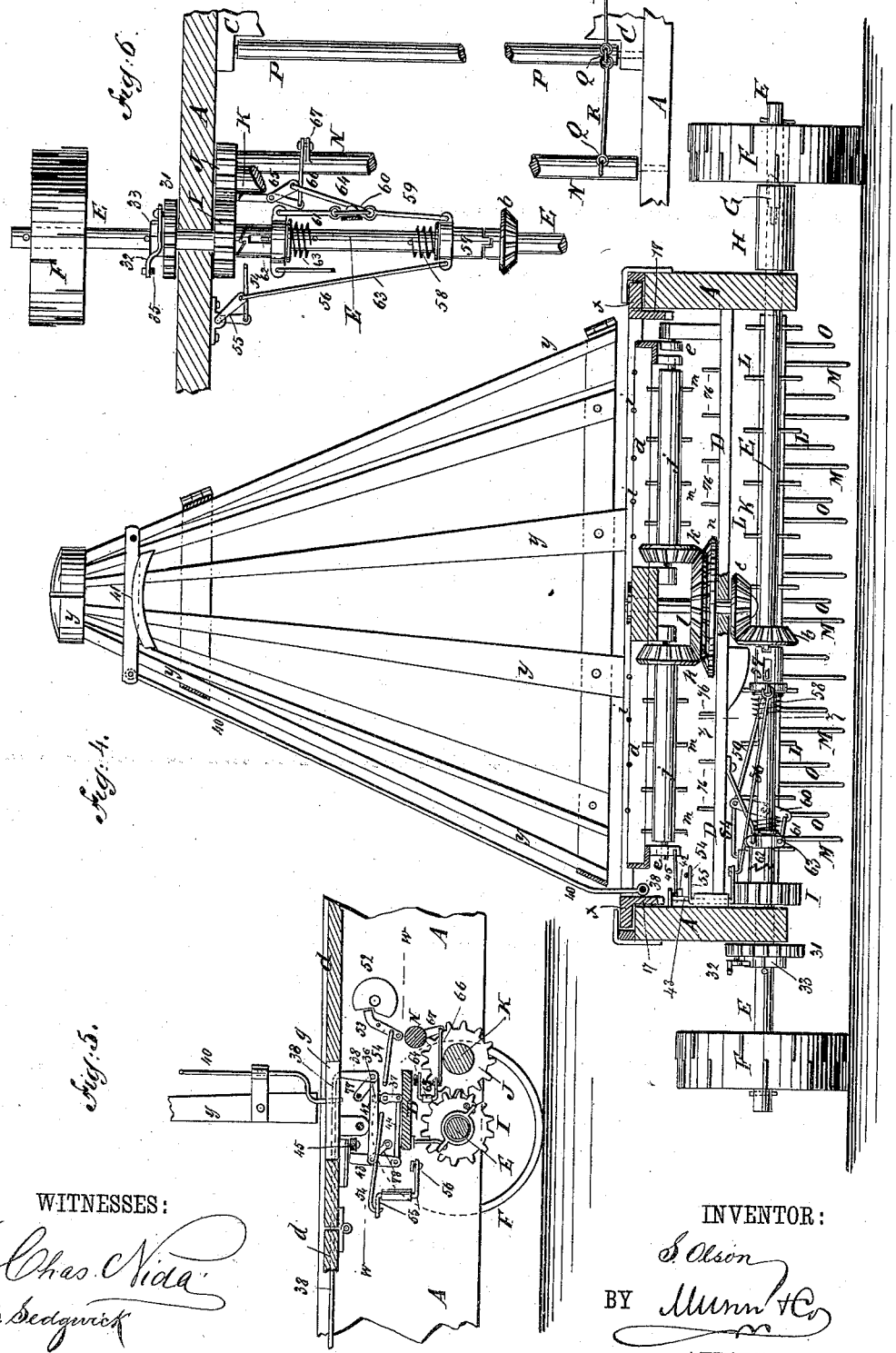

UNITED STATES PATENT OFFICE.

SAMUEL OLSON, OF CYRUS, MINNESOTA.

COMBINED HAY RAKE AND COCKER.

SPECIFICATION forming part of Letters Patent No. 335,834, dated February 9, 1886.

Application filed April 1, 1885. Serial No. 160,921. (No model.)

*To all whom it may concern:*

Be it known that I, SAMUEL OLSON, of Cyrus, in the county of Pope and State of Minnesota, have invented certain new and useful Improvements in Combined Hay Rakes and Cockers, of which the following is a full, clear, and exact description.

Reference is to be had to the accompanying drawings, forming part of this specification, in which similar letters of reference indicate corresponding parts in all the figures.

Figure 1:
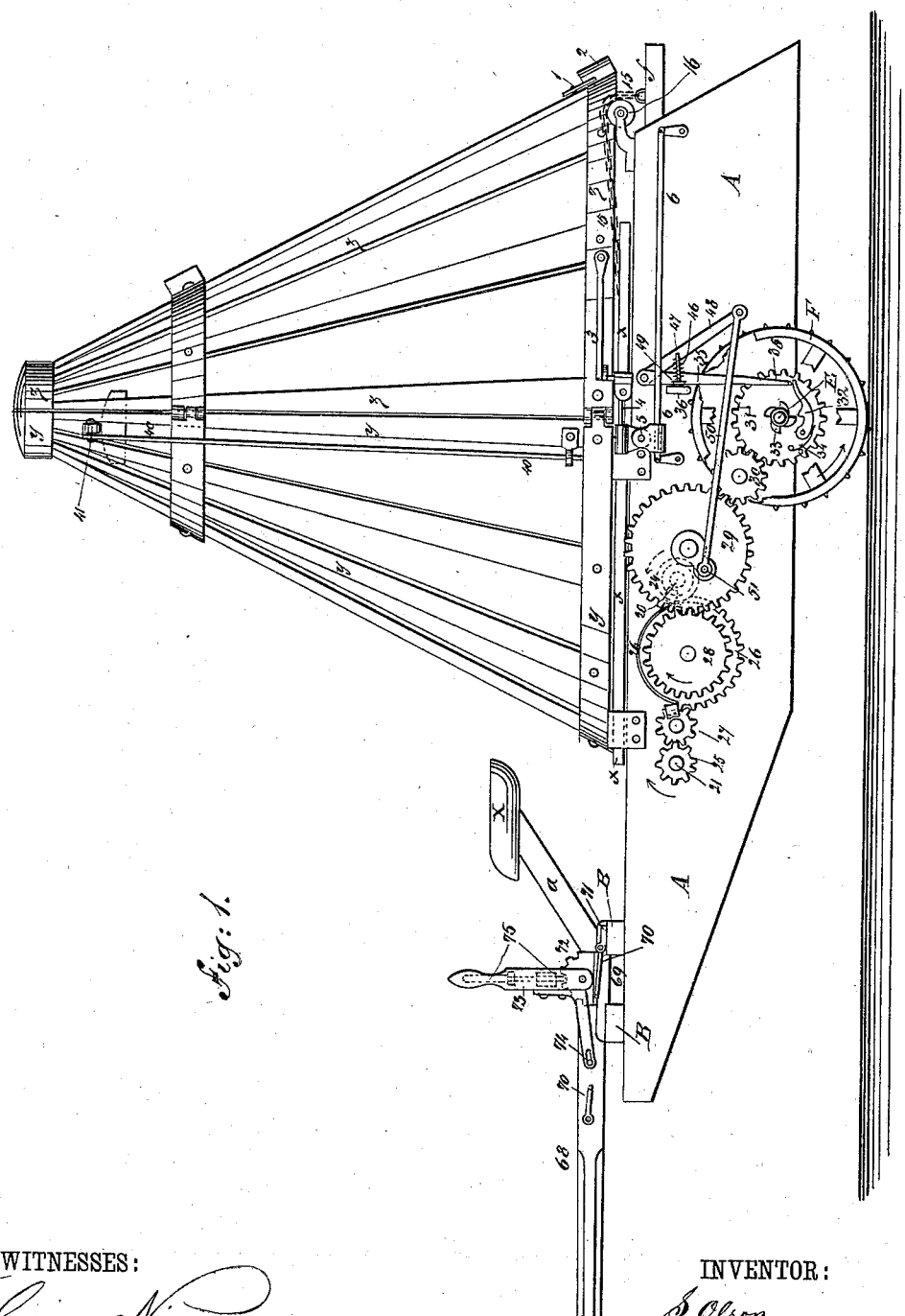
Figure 2:
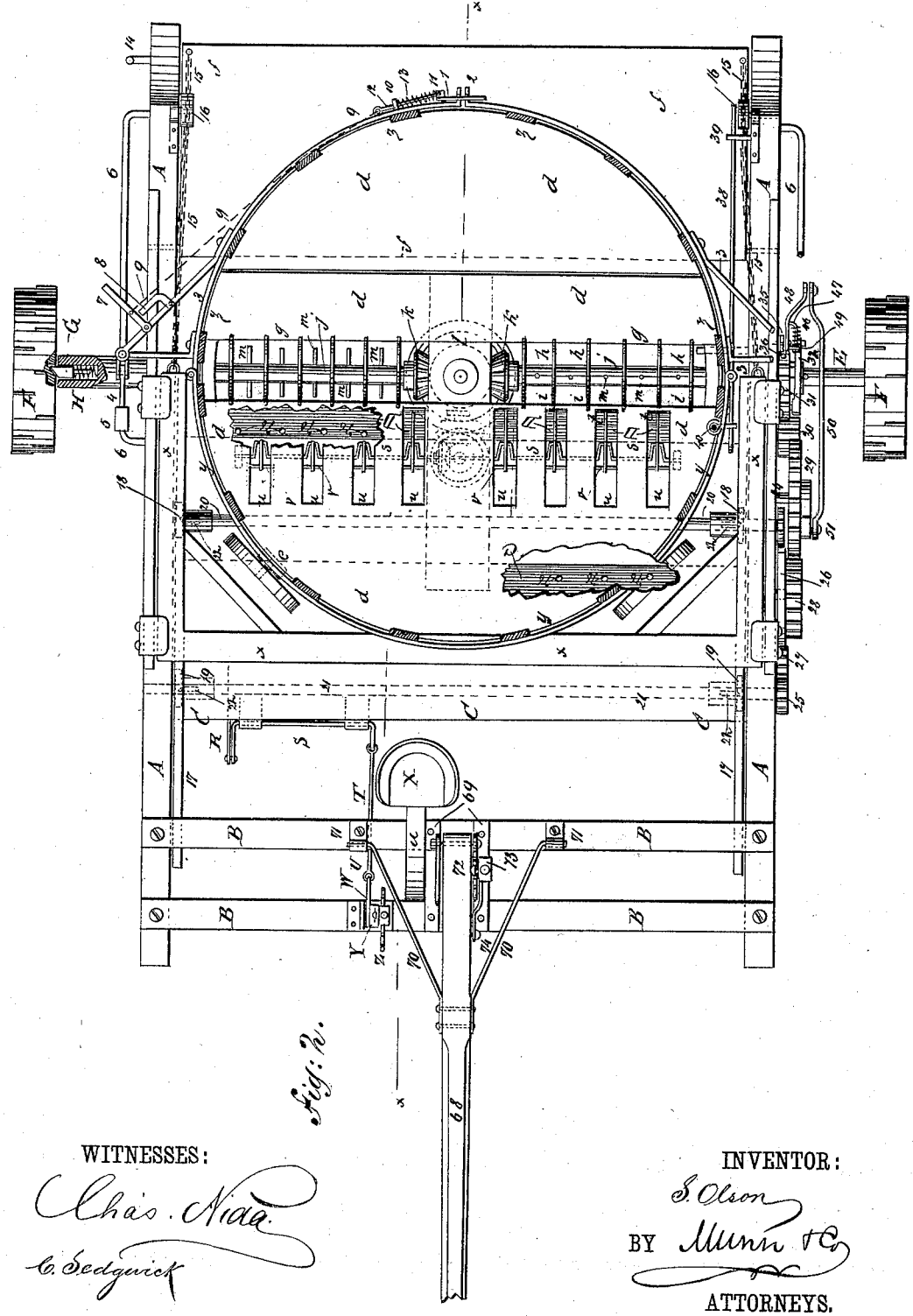

Figure 1, Sheet 1, is a side elevation of one of my improved machines, part being broken away. Fig. 2, Sheet 2, is a plan view of the same, the basket being shown in section and parts being broken away. Fig. 3, Sheet 3, is a sectional side elevation of the same, taken through the broken line $x\,x$, Fig. 2. Fig. 4, Sheet 4, is a sectional rear elevation of the machine, taken through the line $y\,y$, Fig. 3. Fig. 5, Sheet 4, is a sectional side elevation of a part of the same, taken through the line $z\,z$, Fig. 4. Fig. 6, Sheet 4, is a sectional plan view of a part of the same, taken through the line $w\,w$, Fig. 5.

The object of this invention is to provide machines constructed in such a manner as to gather the hay from the meadow, form it into cocks, and deposit the cocks upon the ground automatically.

The invention consists in the construction and combination of various parts of the machine, as will be hereinafter fully described, and then pointed out in the claims.

A are the side bars, which are made wide, as shown in Figs. 1, 3, 4, and 5, and are set edgewise, as shown in Figs. 2, 4, and 6. The side bars, A, are connected at their forward ends by two cross-bars, B, and at their middle parts by stationary platforms or wide cross-bars C D.

The lower edges of the forward ends of the side bars, A, are beveled, as shown in Figs. 1 and 3, to allow the forward end of the machine to be raised and lowered to cause the rake-teeth to work at any desired distance from the ground.

In bearings in the lower middle parts of the side bars, A, revolves the axle E. Upon the ends of the axle E are placed the drive-wheels F, one of which is connected with the axle E by a spring-pawl, G, engaging with ratchet-teeth upon the inner side of one of the said drive-wheels and covered by a sleeve, H. To the axle E, at the inner side of one of the side bars, A, is attached a gear-wheel, I, the teeth of which mesh into the teeth of the gear-wheel J, attached to the end of the shaft K. The shaft K is placed in front of the axle E, is pivoted to the side bars, A, and is provided with radial teeth L, which project between the rake-teeth M that collect the hay, so that the hay will be carried up the said rake-teeth by the revolution of the said toothed shaft K. The rake-teeth M are attached at their upper ends to a shaft, N, pivoted to the side bars, A.

The hay is held against the teeth M while being carried up the said teeth by the guide-fingers O, attached at their upper ends to the shaft P, which is pivoted to the side bars, A.

To the shafts N P are attached downwardly-projecting arms Q, the ends of which are pivoted to the rod R. The forward end of the rod R is pivoted to an arm of the crank-shaft S, which rocks in bearings attached to the forward part of the forward stationary platform, C. To the other arm of the crank-shaft S is pivoted the lower end of a connecting-rod, T, the upper end of which is pivoted to an arm of an elbow-lever, U. The elbow-lever U is pivoted at its angle to the rear cross-bar, B, and to its other arm is pivoted the lower end of a short connecting-rod, V, the upper end of which is pivoted to the short arm of an elbow-lever, W. The lever W is pivoted at its angle to supports attached to the front cross-bar, B, and its upper arm projects upward into such a position that it can be readily reached and operated by the driver from his seat X, to raise the teeth M and the guide-fingers O away from the ground and to lower them into a working position. The lever W is held in any position into which it may be adjusted by a lever-pawl, Y, which engages with a catch-plate, Z, attached to the front cross-bar, B.

The driver's seat X is attached to the upper end of an inclined standard, $a$, the lower end of which is attached to the cross-bars B.

Upon the middle part of the axle E is placed a beveled gear-wheel, $b$, the teeth of which mesh into the teeth of the beveled gear-wheel $c$. The beveled gear-wheel $c$ is journaled to the rear stationary platform, D, and to the upper end of its journal is attached the center of the circular platform, d, so that the said platform will be rotated from the axle E by the gear-wheels b c. The rotary platform d rests upon small wheels e, pivoted to supports attached to the stationary platforms C D, a side bar, A, and the concaved forward edge of the tilting platform f, which is pivoted at its forward corners to the side bars, A. The rotary platform d is made in two unequal parts, the smaller one of which is hinged at its straight edge to the straight edge of the larger part, so that the said smaller part will be lowered with the tilting platform f, to allow the cock to slide to the ground.

In the larger part of the rotary platform d and parallel with its straight edge, are formed two radial slots, g, through which the hay passes from the lower to the upper side of the said rotary platform d. The hay is guided to the slots g by the guide-fingers h i. The fingers h are attached to the platform d at the rear edges of the slots g, and are bent downward and then forward to pass beneath the feed-shaft j, as shown in Fig. 3. The fingers i are attached to the platform d at the forward edges of the slots g, are bent downward, pass around the feed-shafts j, and are bent upward and are attached to the lower side of the said platform at the front edges of the slots g, so that the hay can reach the said slots g only by passing between the fingers h i. The feed-shafts j are pivoted to supports attached to the rotary platform d, and to their inner ends are attached beveled gear-wheels k, the teeth of which mesh into the teeth of the stationary beveled gear-wheel l, attached to the rear stationary platform, D, and through the center of which passes the shaft of the gear-wheel c, that carries the rotary platform d, so that the feed-shaft j will be revolved by the revolution of the said rotary platform d. The feed-shafts j are provided with teeth m, to take hold of the hay, carry it through the space between the guide-fingers h and i, and force it through the slots g. The teeth m are curved to the rearward to prevent them from becoming entangled with the hay.

To the left-hand part of the forward stationary platform, C, and the right-hand part of the rear stationary platform, D, are attached rows of projecting pins 76, to prevent the hay from being carried forward by the rotary platform d and detain it until it has been carried up by the guide-fingers h i and the toothed shaft j.

With the stationary beveled gear-wheel l is connected a beveled gear-wheel, n, which engages with one part of a double-beveled gear-wheel, o, journaled to a bracket, p, or other support attached to the rotary platform d. The other part of the double-beveled gear-wheel o engages with one part of a double-beveled gear-wheel, q, journaled to a support attached to the rotary platform d. The teeth of the other part of the double-beveled gear-wheel q mesh into the teeth of a beveled gear-wheel, r, attached to a crank-shaft, s, which revolves in bearings attached to the lower side of the rotary platform d. Upon the cranks of the shaft s are pivoted the middle parts of levers t, which are placed in openings or short slots u in the rotary platform d at a little distance from the radial slots g, as shown in Fig. 2. The rear ends of the levers t pass vertically through the slots u, and to their forward ends are attached cross-pins v, the ends of which slide in grooves w in the edges of the rotary platform d at the opposite sides of the slots u.

The beveled gear-wheel n is so arranged that the crank-shaft s will be revolved and the free ends of the levers t vibrated and horizontally reciprocated at the time that hay is passing up through the slots g to raise the hay already upon the platform d and allow the entering hay to pass in beneath hay previously received.

The hay received upon the rotary platform d is made to take the tapered form of a cock by the tapered basket y z, the forward half, y, of which is rigidly attached to a frame, x, consisting of two side bars resting and sliding upon the upon the upper edges of the side bars, A, and connected at their forward ends by a cross-bar, the connection being strengthened by inclined braces. The rear half of the basket is made in two parts, z, which are hinged at their outer edges to the edges of the forward half, y, and are connected at their adjacent edges when closed by a latch, 1, hinged to the one part and engaging with a catch, 2, attached to the other part.

To the lower corners of the parts z, near their hinged edges, are attached brackets 3, the outer ends of which are bent downward and are pivoted to the rear ends of rods 4. The forward ends of the rods 4 are pivoted to the upper ends of jointed couplings 5, the lower ends of which are pivoted to and slide upon rods 6, placed at the outer sides of the upper parts of the side bars, A. The ends of the rods 6 are bent inward and downward, and are secured to the side bars, A. By this construction the brackets 3, rods 4, jointed couplings 5, and rods 6 serve as stops to the basket and its frame in their rearward and forward movement, and at the same time allow the parts z of the said basket to open freely.

To one of the brackets 3 is pivoted an outwardly-projecting-arm, 7, the forward movement of which is limited by a stop-bar, 8, rigidly attached to the bracket 3. To the pivoted arm 7 is attached the end of a wire, 9, the other end of which is attached to the end of a short rod, 12, which passes through the guide 10, attached to the part z of the basket, and the other end of which is attached to an arm, 11, formed upon or attached to the latch 1.

Upon the rod 12, between the guide 10 and the arm 11, is placed a spiral spring, 13, to hold the latch 1 down and cause it to engage automatically with the catch 2 when the parts z of the basket are swung shut. To the side bar, A, a little in the rear of the rear end of the guide-rod 6, is attached the lower end of an arm, 14, against which the arm 7 strikes when the basket is at or near the end of its rearward movement, and is pushed forward, raising the latch 1, and allowing the rear parts, z, of the basket to swing open and release the hay-cock.

To the rear corners of the tilting platform $f$ are attached the rear ends of short chains 15, which pass over guide-pulleys 16, pivoted to supports attached to the upper rear corners of the side bars, A. The forward ends of the chains 15 are attached to the rear ends of the side bars of the sliding frame $x$. The tilting platform $f$ will drop by its own weight, and allow the tilting part of the rotary platform $d$ to drop and the hay-cock to slide off the said platform to the ground when the said sliding frame moves to the rearward, and will be raised into and supported in a horizontal position by the chains 15 when the said frame moves forward.

To the side bars of the sliding frame $x$ are attached toothed rack-bars 17, the teeth of which mesh into the teeth of the gear-wheels 18 19, placed upon the shafts 20 21. The shafts 20 21 are journaled to the side bars, A, and are made to carry the gear-wheels 18 19 with them in their revolution by the spring-pawls 22, attached to them, and which engage with ratchets 23, formed upon or attached to the said gear-wheels 18 19. The pawls and ratchets 22 23 of the two shafts 20 21 and gear-wheels 18 19 are arranged in reversed positions, so that when the gear-wheels 18 are carrying the rack-bars 17 and their attachments forward the gear-wheels 19 will run free upon the shaft 21, and when the gear-wheels 19 are carrying the rack-bars 17 and their attachments to the rearward the gear-wheels 18 will run free upon the shaft 20. The ends of the shafts 20 21 project at one side of the machine, and to them are attached gear-wheels 24 25. The gear-wheel 24 engages with the rear side of the mutilated gear-wheel 26, and the gear-wheel 25 engages with the intermediate gear-wheel, 27, interposed between it and the mutilated gear-wheel 26, so that the gear-wheels 24 25 and their shafts 20 21 will be driven in opposite directions.

The gear-wheel 26 has teeth only upon one side, as shown in Fig. 1, so that the gear-wheels 24 25 and their shafts 20 21 will be driven successively. The mutilated gear-wheel 26 is pivoted to the side bar, A, and with it is rigidly connected the gear-wheel 28, the teeth of which mesh into the teeth of the gear-wheel 29, journaled to the side bar, A. The teeth of the gear-wheel 29 mesh into the teeth of the small intermediate gear-wheel, 30, pivoted to the side bar, A, and the teeth of which mesh into the teeth of the gear-wheel 31. The gear-wheel 31 runs loose upon the axle E, and to its side is pivoted a pawl, 32, which has a tooth upon its upper side to engage with the teeth of the ratchet-wheel 33, rigidly attached to the axle E. The pawl 32 is drawn against the teeth of the ratchet-wheel 33 by a straight spring, 34, or other suitable spring attached to the gear-wheel 31 and connected with the said pawl 32.

As the gear-wheel 31 completes each revolution, the free end of the pawl 32 comes in contact with a shoulder upon the lower end of the bar 35, and is stopped so that the said pawl will be knocked away from the teeth of the ratchet-wheel 33, and the gearing that drives the sliding frame will be stopped.

Against the forward side of the catch-bar 35, when in position to engage with the pawl 32, rests the vertical arm of the rock-shaft 36, which passes through and rocks in a bearing in the side bar, A, so that the said arm can be turned down toward a horizontal position to push the catch-bar 35 back and release the pawl 32.

To the inner end of the rock-shaft 36 is attached the end of a short crank-arm, 37, the other end of which is pivoted to the end of the rod 44. The rod 38 passes up vertically for a short distance, is then bent to the rearward, passes along the upper part of the inner side of the side bar, A, and its rear part passes through a guide-keeper, 39, attached to the said side bar, A.

The horizontal part of the rod 38 passes through an eye in the lower end of the rod 40, which passes up along the side of the basket $y\ z$, and is pivoted at its upper end to the end of the trip-bar 41. The other end of the trip-bar 41 is pivoted to the other side of the upper part of the basket $y\ z$.

The middle part of the bar 41 is made wide, and is concaved upon the lower side, or has a concaved plate attached to it to give the hay a firm hold upon the said trip-bar 41.

To the pivot that connects the lower end of the rod 38 and the guide-link 77 is pivoted the end of the connecting-bar 42, the other end of which is pivoted to the middle part of the lever 43 and to the upper end of the guide-link 78. The lower end of the lever 43 is pivoted to the rear end of the bar 44, the forward end of which is pivoted to the crank-arm 37. The lever 43 extends upward along the side bar, A, so that it can be operated by a horizontal lever, 45, pivoted to a support attached to the side bar, A, with its inner end in a recess in the said side bar, so that its outer end can be struck and operated by a tooth on the bearing of the toothed shaft $j$ or on the rotary platform $d$. With this construction when the basket $y\ z$ becomes full of hay the upward pressure of the hay operates the lever 41 to raise the rod 38, and pulls the lever 43 up to the horizontal lever 45, to be struck by the latter lever to push back the bar 44 and operate the crank-arm 37, to push back the catch-bar 35 and allow the pawl 32 to drop into gear with the ratchet-wheel 33, and set in motion the gearing that operates the sliding frame $x$ and its attachments. The parts which are concerned in tripping the pawl 32 are thrown back to their original position by the action of spring 46.

The catch-bar 35 is held forward by a spiral spring, 46, placed upon a guide-rod, 47, attached to the bar 48, and passing through a lug, 49, formed upon the said catch-bar 35, and against which the end of the said spring 46 rests. The upper end of the bar 48 is pivoted to the same pivot as the upper end of the catch-bar 35, and to its lower end is pivoted the end of a connecting-bar, 50, the other end of which is pivoted to a crank-pin, 51, attached to the gear wheel 29. By this construction the catch-bar 35 will be put under a greater spring-pressure as the gear-wheel 29 completes its revolution, and the said catch-bar 35 is to be moved forward to engage with the pawl 32.

To the inner end of the journal of the gear-wheel 29, upon the inner side of the side bar, A, is attached a wheel, 52, having a recess in one side in such a position as to receive the curved upper end of a lever, 53, when the pawl 32 is out of gear, so that when the said pawl is thrown into gear and the gear-wheel 29 is started, the shoulder of the said recess will act as a cam to operate the said lever and throw out of gear the mechanism for rotating the platform $d$ and the toothed shafts $j\,j$, and hold the said mechanism out of gear until the wheels 29 52 have completed a revolution and the pawl 32 is again thrown out of gear. The lever 53 is pivoted to the side bar, A, and to its lower end is pivoted the end of a connecting-bar, 54, the other end of which is pivoted to an inwardly and rearwardly projecting arm of the crank-shaft 55. The crank-shaft 55 rocks in a bearing attached to the side bar, A, and to its inwardly and forwardly projecting arm is pivoted the outer end of the connecting-bar 56. The inner end of the connecting-bar 56 is pivoted to the sliding clutch 57, that connects the beveled gear-wheel $b$ with the axle E, and which is placed upon the axle E, and is held forward by a spiral spring, 58, also placed upon the said axle, so that the said gear-wheel and the platform $d$ and the toothed shafts $j\,j$ will be thrown out of and into gear with the axle E by the action of the recessed wheel 52 upon the lever 53. With the sliding clutch 57 is also connected the end of a connecting-rod, 59, the other end of which is pivoted to the upper end of a lever, 60. The lever 60 is pivoted at its middle part to a support attached to the rear stationary platform, D, and to its lower end is pivoted the end of a connecting-rod, 61, the other end of which is pivoted to the sliding clutch 62, placed upon the axle E, and engaging with the gear-wheel I, placed upon the said axle E, so that the toothed shaft K can be thrown into and out of gear with the said axle by operating the clutch 57. The clutch 62 is held against the gear-wheel I by a spiral spring, 63, placed upon the axle E. To the upper end of the lever 60 is also pivoted the end of a connecting-rod, 64, the other end of which is pivoted to the inwardly and forwardly projecting arm of the crank-shaft 65. The crank-shaft 65 rocks in bearings attached to a bracket or support fastened to a side bar, A, and to the end of its inwardly and rearwardly projecting arm is pivoted the rear end of a connecting-rod, 66, the forward end of which is pivoted to an upwardly-projecting arm, 67, attached to the shaft N, that carries the rake-teeth M, so that all the driving-gearing of the machine will be thrown out of gear with the axle E by operating the lever W to raise the rake-teeth M and the guide-fingers O from the ground.

68 is the tongue by means of which the machine is drawn and guided, and which is hinged at its rear end to a support, 69, attached to the cross-bars B. The tongue 68 is strengthened against side strain by braces or hounds 70, which are attached at their forward ends to the opposite sides of the rear part of the said tongue, and at their rear ends are hinged to supports 71, attached to the rear cross-bar, B. To the support 69 is attached or upon it is formed a toothed catch-plate, 72, to which is pivoted the angle of the elbow-lever 73. The lower arm of the elbow-lever 73 is slotted to receive the bolt 74, that connects the said arm with the tongue 68, or is connected with the said tongue by a link.

The upright arm of the elbow-lever 73 is provided with a spring lever-pawl, 75, to engage with the toothed catch-plate 72, and hold the said elbow-lever in any position into which it may be adjusted.

The elbow-lever 73 is designed for use in leveling the machine.

Having thus described my invention, I claim as new and desire to secure by Letters Patent—

1. In a combined hay rake and cocker, the combination, with the frame A B C D, the axle E, and the drive-wheels F, of the rake-teeth, guide fingers, and toothed shafts M O P, the guide-fingers and toothed shafts $h\ i\ j\ j$, the gear-wheels I J and $b\ c\ l\ k$, and the rotary platform $d$, having radial slots, substantially as herein shown and described, whereby the hay will be collected and raised above the said platform, as set forth.

2. In a combined hay rake and cocker, the combination, with the wheels and axle F E, and the rotating platform $d$, having parallel slots $u$, of the gear-wheels $b\ c$, the beveled gear-wheel $n$, the gear-wheels $o\ q\ r$, the crank-shaft $s$, and the pivoted levers $t$, substantially as herein shown and described, whereby the hay upon the said platform is raised to admit more hay, as set forth.

3. In a combined hay rake and cocker, the combination, with the frame A B C D, the wheels and axles F E, and the rotary platform $d$, of the basket $y\ z$, the sliding frame $x$ and its driving mechanism, substantially as herein shown and described, whereby the hay will be formed into a cock and discharged from the machine, as set forth.

4. In a combined hay rake and cocker, the combination, with the frame A B C D, the sliding frame $x$, and the rotary platform $d$, having hinged section, of the hinged platform $f$, the chains 15, and the guide-pulleys 16, substantially as herein shown and described, whereby the discharged cock is allowed to slide easily to the ground, as set forth.

5. In a combined hay rake and cocker, the combination, with the frame A B C D, the hinged parts of the basket $y\ z$, and the latch and spring 1 13, of the brackets 3, the hinged and pivoted connections 4 5, the guide-rods 6, the pivoted trip-arm 7, the connecting-wire 9, and the stop-arm 14, substantially as herein shown and described, whereby the said hinged parts of the basket will be opened and closed automatically as the said basket is moved back and forward, as set forth.

6. In a combined hay rake and cocker, the combination, with the wheels and axle F E, the frame A B C D, and the sliding frame $x$, of the rack-bars 17, the gear-wheels and shafts 18 19 20 21, the gear-wheels 24 25 27, the mutilated gear-wheel 26, the gear-wheels 28 29 30 31, and the spring-pawl 32, and ratchet-wheel 33, substantially as herein shown and described, whereby the said sliding frame will be operated from the said wheels and axle, as set forth.

7. In a combined hay rake and cocker, the combination, with the basket $y\ z$, the frame A B C D, the rotary platform $d$, and the spring-pawl 32, of the lever 41, the connecting-rod 40, the guide-rod 38, the crank-arm 37, the rock-lever 36, the spring-pressed swinging catch-bar 35, the connecting-bars 42 44, and the levers 43 45, and the gearing between the spring-pawl and the sliding frame, substantially as herein shown and described.

8. In a combined hay rake and cocker, the combination, with the swinging catch-bar 35, the spring 46, and the large gear-wheel 29, of the swinging bar 48, and the connecting-bar 50, together with the spring-pawl, and additional gear-wheels connecting the sliding frame and the aforesaid gear-wheel, substantially as herein shown and described, whereby the tension of the said spring is automatically varied, as set forth.

9. In a combined hay rake and cocker, the combination, with the large gear-wheel 29, the frame A B C D, the axle E, and the gear-wheel $b$, that drives the mechanism that operates the rotary platform $d$, the upper toothed shafts, $j$, and the lifting-levers $t$, of the recessed wheel 52, the lever 53 engaging therewith, the connecting-rods 54 56, the crank-shaft 55, and the clutch and spring 57 58, substantially as herein shown and described, whereby the said mechanism will be thrown out of and into gear by the revolution of the said large gear-wheel, as set forth.

10. In a combined hay rake and cocker, the combination, with the axle E, the gear-wheel $b$, that drives the mechanism that operates the rotary platform, the upper toothed shafts, and the lifting-levers, and the gear-wheels that operate the lower toothed shaft, of the clutches 57 62, the springs 58 63, the connecting-rods 59 61 64, the lever 60, the crank-shaft 65, the connecting-rod 66, and the rigid arm 67, attached to the rake-shaft N, together with means, substantially as described, for rocking said shaft, substantially as herein shown and described, whereby the movement of the said shaft, when turned to raise the rake-teeth from the ground, will withdraw the said clutches from their gear-wheels, and thus throw the said gear-wheels out of gear, as set forth.

11. In a combined hay rake and cocker, the combination, with the frame A B C D, and the rock-shafts N P, carrying the rake-teeth M and the guide-fingers O, of the elbow-levers W U, the connecting-rods V T R, the crank-shaft S, and the rigid arms Q Q, attached to the said rock-shaft, substantially as herein shown and described, whereby the said rock-shafts can be readily turned to raise the said rake-teeth and guide-fingers from the ground, as set forth.

SAMUEL OLSON.

Witnesses:
 GEO. E. DARLING,
 H. E. OLSON.